US011133539B2

(12) United States Patent
Berge et al.

(10) Patent No.: US 11,133,539 B2
(45) Date of Patent: Sep. 28, 2021

(54) COOLING SYSTEM AND METHOD

(71) Applicant: SIEMENS ENERGY AS, Oslo (NO)

(72) Inventors: Tore Berge, Trondheim (NO); Eirik Børsheim, Oslo (NO); Arve Skjetne, Trondheim (NO)

(73) Assignee: SIEMENS ENERGY AS, Oslo (NO)

( * ) Notice: Subject to any disclaimer, the term of this patent is extended or adjusted under 35 U.S.C. 154(b) by 0 days.

(21) Appl. No.: 16/496,223

(22) PCT Filed: Mar. 29, 2018

(86) PCT No.: PCT/EP2018/058143
§ 371 (c)(1),
(2) Date: Sep. 20, 2019

(87) PCT Pub. No.: WO2018/184998
PCT Pub. Date: Oct. 11, 2018

(65) Prior Publication Data
US 2020/0058967 A1 Feb. 20, 2020

(30) Foreign Application Priority Data

Apr. 5, 2017 (GB) ..................................... 1705513

(51) Int. Cl.
| | |
|---|---|
| *H01M 10/613* | (2014.01) |
| *H01M 10/6567* | (2014.01) |
| *H01M 2/10* | (2006.01) |
| *H01M 8/04007* | (2016.01) |
| *H01G 2/08* | (2006.01) |
| *H01M 50/20* | (2021.01) |

(52) U.S. Cl.
CPC ............ *H01M 10/613* (2015.04); *H01G 2/08* (2013.01); *H01M 8/04067* (2013.01); *H01M 10/6567* (2015.04); *H01M 50/20* (2021.01)

(58) Field of Classification Search
CPC ........... H01M 10/613; H01M 10/6567; H01M 2/1077; H01M 8/04067; H01M 10/653; H01M 8/04007; H01M 2200/10; H01M 10/625; H01G 2/08; Y02E 60/10; Y02E 60/50; F28D 20/02
See application file for complete search history.

(56) References Cited

U.S. PATENT DOCUMENTS

| | | | |
|---|---|---|---|
| 2009/0087727 A1* | 4/2009 | Harada | ............. H01M 10/0525 429/120 |
| 2009/0255109 A1 | 10/2009 | Weber et al. | |
| 2010/0136391 A1 | 6/2010 | Prilutsky et al. | |
| 2010/0257883 A1 | 10/2010 | Damsohn et al. | |
| 2012/0328916 A1 | 12/2012 | Enning | |
| 2013/0196195 A1 | 8/2013 | Nguyen et al. | |
| 2016/0043454 A1* | 2/2016 | Shaaia | ...................... F28F 3/12 429/120 |
| 2016/0204483 A1 | 7/2016 | Schilder et al. | |
| 2018/0123201 A1* | 5/2018 | Fees | .................... H01M 10/625 |

FOREIGN PATENT DOCUMENTS

| | | |
|---|---|---|
| DE | 102010009478 A1 | 9/2011 |
| DE | 102013113797 A1 | 6/2015 |
| EP | 2181481 A1 | 5/2010 |
| EP | 2945218 A1 | 11/2015 |
| WO | 2016131141 A1 | 8/2016 |
| WO | 2017021019 A1 | 2/2017 |

OTHER PUBLICATIONS

International search report and written opinion dated Jul. 6, 2018, for corresponding PCT/EP2018/058143.

* cited by examiner

*Primary Examiner* — Muhammad S Siddiquee

(57) ABSTRACT

An energy storage module with one or more energy storage devices and a cooler on which the energy storage device is mounted in contact with the energy storage device. The cooler has one or more cooling fluid channels for circulating cooling fluid, the channels being in contact with a surface of the energy storage device, each cooling fluid channel being adapted to receive cooling fluid from a source of cooling fluid, extract heat from the energy storage device and return the cooling fluid to the source. At least a part of the cooling fluid channel includes a material having a melting point above 100° C.

13 Claims, 4 Drawing Sheets

COOLING SYSTEM AND METHOD

CROSS REFERENCE TO RELATED APPLICATIONS

This application is the US National Stage of International Application No. PCT/EP2018/058143 filed Mar. 29, 2018, and claims the benefit thereof. The International Application claims the benefit of United Kingdom Application No. GB 1705513.8 filed Apr. 5, 2017. All of the applications are incorporated by reference herein in their entirety.

FIELD OF INVENTION

This invention relates to a cooling system and method for a stored energy module, in particular for one comprising an electrochemical energy storage device, such as a cell, or battery, providing electrical energy to an end user.

BACKGROUND OF INVENTION

Stored electrical energy modules, or power units of various types are becoming increasingly common in many applications, in particular for use where there are environmental concerns relating to emissions in sensitive environments, or public health concerns. Stored electrical energy power units are typically used to provide electrical energy to operate equipment, to avoid emissions at the point of use, although that stored energy may have been generated in many different ways. Stored electrical energy may also be used to provide peak shaving in systems otherwise supplied from the grid, or from various types of power generation system, including diesel generators, gas turbines, or renewable energy sources. Aircraft, vehicles, vessels, offshore rigs, or rigs and other powered equipment in remote locations are examples of users of large scale stored electrical energy. Vehicle drivers may use the stored energy power unit in city centres and charge from an internal combustion engine on trunk roads, to reduce the harmful emissions in the towns and cities, or they may charge up from an electricity supply. Ferries which carry out most of their voyage relatively close to inhabited areas, or in sensitive environments are being designed with hybrid, or fully electric drive systems. Ferries may operate with stored energy to power the vessel when close to shore, using diesel generators offshore to recharge the batteries. In some countries the availability of electricity from renewable energy sources to use to charge the stored energy unit means that a fully electric vessel may be used, provided that the stored energy units are sufficiently reliable for the distances being covered, with no diesel, or other non-renewable energy source used at all. Whether hybrid, or fully electric, the stored energy units may be charged from a shore supply when docked. The development of technology to achieve stored energy units that are reliable enough for prolonged use as the primary power source must address certain technical issues.

US20160204483 A1 describes a cooling system using cooling fins with a secondary coolant channel having an aperture filled with a melting material which obstructs coolant flow below a threshold temperature.

WO2009011749 A1 describes a method of mitigating propagation of a thermal event in an energy storage system using sensors to detect a heat source in the system and provide coolant through cooling tubes in potting compound in which the cells are mounted by their ends. Plastic in a portion of the cooling tube may melt to allow cooling fluid onto nearby cells detected as being above a predetermined temperature.

US20100136391 A1 describe thermal runaway mitigation by suppling fluid in a conduit near in proximity of cells, the conduit having breach points which melt at a pre-set temperature to supply cooling fluid to cells through the breach.

SUMMARY OF INVENTION

In accordance with a first aspect of the present invention, an energy storage module comprising one or more energy storage devices; and for each energy storage device, a cooler on which the energy storage device is mounted, the cooler being in contact with the energy storage device; wherein the cooler comprises one or more cooling fluid channels for circulating cooling fluid, the channels being in contact with a surface of the energy storage device, each cooling fluid channel being adapted to receive cooling fluid from a source of cooling fluid, extract heat from the energy storage device and return the cooling fluid to the source; wherein the cooling fluid channels comprise a polymer material, in particular polythene, polyamide, or thermal plastic; and wherein at least a part of the cooling fluid channel comprises a material having a melting point between 100° C. and 400° C., in particular, between 100° C. and 300° C.

The cooling fluid channels remain intact during normal operation of the energy storage devices, but if the temperature of the energy storage device exceeds the safe operating temperature of the energy storage devices and there is a risk of thermal runaway, the cooling channels melt to provide a substantial cooling effect.

The cooler may be formed by additive manufacturing, welding or lamination and may be separate from, or an integral part of a carrier, or mount on which the energy storage device is mounted.

The cooling fluid channels may have a circular or square cross section.

The cooling fluid channels may comprise a polymer material, in particular polythene, polyamide, or thermal plastic.

The cooling fluid channels may be chosen to have a wall thickness of no more 5 mm.

At least 30% of one surface of the energy storage device may be in contact with the cooling fluid channels of the cooler.

At least 75% of one surface of the energy storage device may be in direct contact with the cooling fluid channels of the cooler.

Direct contact between the cooling fluid channels and the surface of the energy storage device is advantageous, although, a flexible sheet may be provided between them, to allow for expansion of the energy storage device over time.

In another embodiment, the cooling fluid channels may further comprise one or more rupture sections having a lower melting point than the melting point of the cooling fluid channels.

The melting point of the one or more rupture sections is typically above the safe operating temperature of the energy storage device, i.e. above 60° C. and advantageously, between 130° C. and 180° C.

The cooling fluid channels may be chosen to have a melting point above 250° C., more advantageously, they are heat resistant up to 400° C. for at least 10 s.

The energy storage device may comprise one of an electrochemical cell, a battery cell, a fuel cell, a capacitor, ultracapacitor, or supercapacitor.

The energy storage device may comprise a Li-ion, NiMH, or alkaline battery.

The cooling fluid may comprise water or water glycol.

In accordance with a second aspect of the present invention, an energy storage module cooling system comprises a plurality of energy storage modules according to the first aspect; a cooling unit comprising a source of cooling fluid, a common cooling fluid inlet pipe and a common cooling fluid outlet pipe; wherein the cooling fluid inlet pipe is connected in parallel to an inlet of each energy storage module; and wherein the cooling fluid outlet is connected to an outlet of each energy storage module.

BRIEF DESCRIPTION OF THE DRAWINGS

An example of a cooling system and method according to the present invention will now be described with reference to the accompany drawings in which.

DETAILED DESCRIPTION OF INVENTION

Figure 1:
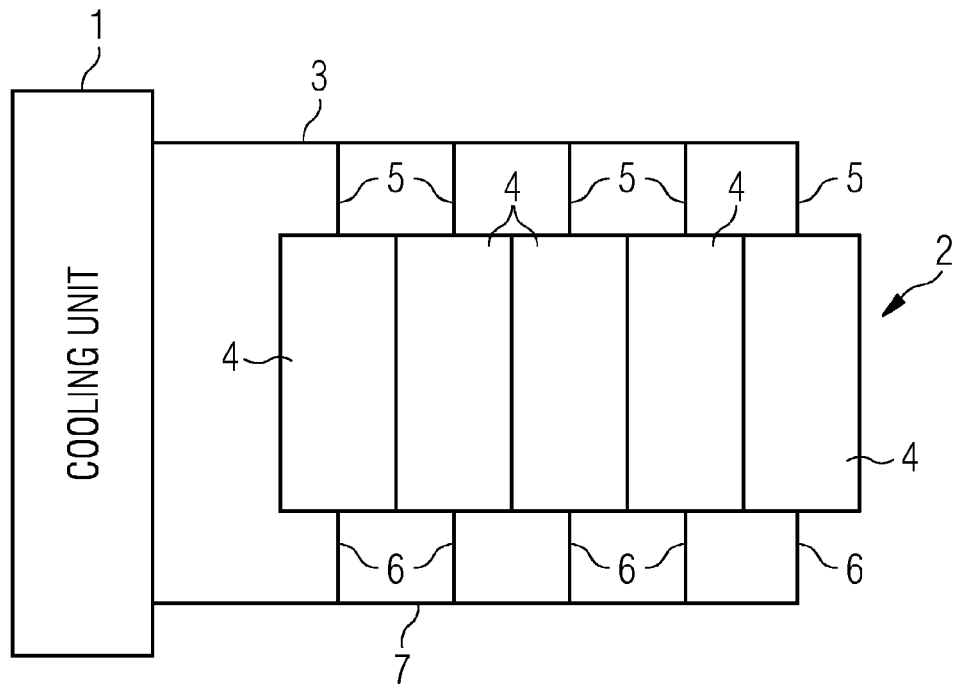
FIG. 1 illustrates an example of a cooling system for use with an energy storage module according to the present invention.

Early large scale batteries were lead acid, but more recently, lithium ion batteries have been developed for electrical energy storage for large scale applications. Li-ion batteries are typically pressurised and the electrolyte is flammable, so they require care in use and storage. A problem which may occur with Li-ion batteries is thermal runaway which may be caused by an internal short circuit in a battery cell, created during manufacture. Other causes, such as mechanical damage, overcharge, or uncontrolled current may also cause thermal runaway, but the battery system design is typically adapted to avoid these. Manufacturing issues with the cells cannot be ruled out entirely, so precautions are required to minimise the effect should thermal runaway occur. In a large scale Li-ion battery system, the amount of energy that is released during a thermal runaway is a challenge to contain. A thermal event may increase temperatures in a single cell from a standard operating temperature in the range of 20° C. to 26° C. to as much as 700° C. to 1000° C. Safe operating temperatures are below 60° C., so this is a significant problem.

There are strict regulations in the marine and offshore industries regarding risk to the vessel or rig, one requirement being that there should be no transfer of excess temperature from one cell to another. If overheating occurs, then it should be contained in a single cell and not allowed to spread. In addition, for marine and offshore applications, weight and volume of any equipment is severely restricted, leading to compact, lightweight systems being advantageous. It is a challenge to produce a compact, lightweight, system that achieves the required thermal isolation and cools the cell in which excess heating occurs, quickly and efficiently. Another problem is that in a thermal event there may also be release of a large amount of flammable gasses, which may self-ignite at elevated temperatures The problem may be addressed by allowing whole modules to enter thermal runaway and simply control the resulting flames and fire with an external fire extinguishing system. In this case there are open flames in the battery space and controlling the resulting flames and fire does not ensure safe transportation and storage. Alternatively, potentially expensive insulation material may be used to thermally isolate the cells from one another, but this compromises cooling system performance and adds volume. A conventional approach is to use thick aluminium fins between each cell to provide the cooling, but this adds weight and volume and still does not ensure safe transportation and storage because heat is conducted extremely well through aluminium (>300 W/mK) and will heat neighbouring cells quickly, if not cooled. During transport and storage, cooling may not be available. The problem of release of flammable gas may be handled by providing a pressure valve in the module casing, releasing the gas at a certain pressure, either into the battery space or into a separate exhaust system. However, conventional pressure release valves are designed to burst under pressure, which leads to other problems. In addition, active cooling may be provided in the exhaust outside the module to avoid self-ignition.

In a Li-ion battery system, it is very important that the temperature of the battery cells does not exceed the prescribed operating temperature and that the cell temperature in the entire system is uniform. Sustained operation outside the prescribed operating temperature window may severely affect the lifetime of the battery cells and increases the risk of thermal runaway occurring. The present invention addresses the problem of preventing thermal runaway from spreading to other cells, should it occur in one cell, as well as helping to increase the operating lifetime of a cell.

For marine applications, there is a particular focus on using energy storage modules, such as battery modules, at their maximum charge or discharge rate due to cost of installation and the weight and space taken up by the modules when on a vessel or offshore platform. Furthermore, maintenance and repair, or replacement is complicated and expensive compared to land based uses of stored energy systems, so extending the lifespan of stored energy modules is particularly important. For the example of Li-ion batteries, these are sensitive to high temperature, so it is important to ensure that the operating and ambient temperature are controlled for all cells of a Li-ion battery system to ensure the design lifetime is met. Local variations or hot spots on a single cell may also compromise the total lifetime achievable.

A common approach for large scale, marine, or offshore, stored energy systems is to use air cooling, with air flowing between cells of a battery system. Another option is to use water cooling in combination with aluminium cooling fins. The water cooling is by flowing over heat exchangers and cooler blocks and the aluminium cooling fins are provided between each cell of the battery system. However, this system is not particularly efficient at removing heat and also adds substantial weight to the energy storage system. Aluminium is chosen for its thermal conductivity and relatively low cost, rather than its lightness. Heat from the batteries must pass to the aluminium cooling fins and those fins are then cooled by the liquid which loses its heat at the heat exchanger and is recirculated.

None of the current methods provide close contact of an effective cooling fluid with the energy storage modules, but either have poor thermal transfer, like air, or cool at one remove, as in the aluminium cooling fins, where the water removes heat from the heat exchanger, not from the energy storage module.

US20100136391 describes a cooling system for automotive applications in which a cooling fluid conduit in proximity with cells of a battery pack is provided with breach points, which breach at a lower temperature than the rest of the conduit to allow cooling fluid to be discharged directly onto a cell to mitigate thermal runaway.

JP2008251263 describes a system for providing a fire-extinguishing agent, or coolant to batteries which are overheating. In a power source provided with a plurality of batteries, the batteries are stacked with a gap between them into which piping is able to direct the fire extinguishing agent or coolant because heat melting parts of the piping melt at the points where the temperature exceeds a prescribed temperature, so that the fire-extinguishing agent, or coolant advantageously comes out of the pipes into the gaps between the batteries through the melted heat melting parts.

However, in both cases, the cooling effect is limited and not particularly targeted to the specific part of the battery where the thermal event starts. The present invention addresses this by providing each cell with a cooler that provides cooling channels over the whole surface of the cell, not just supplying coolant from above the cell in case of a thermal event. This allows for distributed cooling over the whole surface for all of the cells of the battery. Direct heat transfer from the cell to the cooling fluid is made possible by constructing the cooling channels from tubes of a polymer material, the tubes having a sufficiently thin wall that thermal conductivity of the material is not a significant consideration. This allows a much wider choice of material to be used, so that weight and cost reduction can also be addressed.

FIG. 1 illustrates an example of a stored energy module cooling system for cooling energy storage modules according to the invention. A cooling unit 1 provides a cooling fluid to the modules 4 of the energy storage unit 2 via inlet pipes 3. In this example, the energy storage unit comprises a plurality of modules 4, each module supplied in parallel with cooling fluid through inlet tubes 5. Alternatively, cooling fluid may be supplied to the energy storage modules in series. The warmed cooling fluid is removed through outlet tubes 6 and returned to the cooling unit 1 via outlet pipes 7. Typically, the warmed fluid is cooled again in the cooling unit and re-circulated in a closed system.

An energy storage module 4 typically comprises a stack of one or more energy storage devices (not shown), for example electrochemical cells, or battery cells, each mounted on a cooler 20, which also functions as a carrier, or mount. This is shown in more detail in FIG. 4. The energy storage device is electrically connected together in series with a neighbouring energy storage device in the next carrier. A module typically comprises between 10 and 30 cells, although more or fewer cells per module are possible. The module may further comprise a substantially gas tight enclosure, a part of which comprises a non-magnetic material. The cells are advantageously prismatic or pouch type cells to get a good packing density. A plurality of energy storage modules may be connected together in series by a DC bus (not shown) to form the energy storage unit 2, or cubicle. A single cell of a module may have a capacity between 20 Ah and 100 Ah, more commonly between 60 Ah and 80 Ah, although cells with a capacity as low as a couple of Ah, or over 100 Ah, may be used. In one example, there may be up to thirty energy storage devices per module 4 and up to nine modules per cubicle, but the precise number may be varied according to the requirement. For example, the unit may comprise between 9 and 21 modules, although this depends upon the application and there may be up to 30, or 40, or as many as 50 modules per cubicle in some cases. Multiple cubicles may be installed on a vessel, or platform, or in any other installation.

Figure 2A:
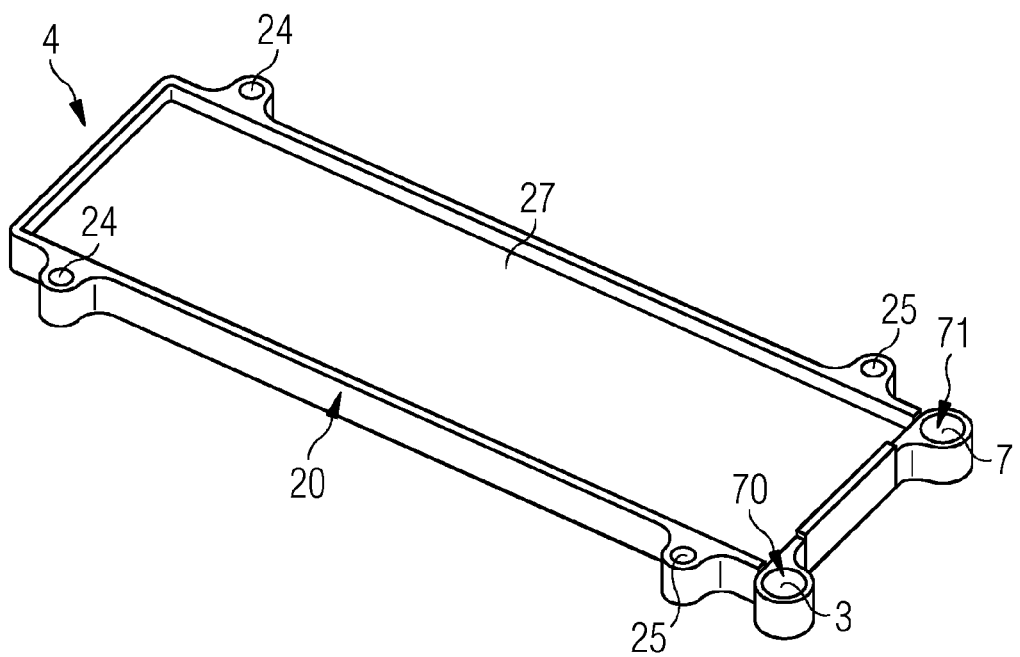
FIGS. 2a and 2b illustrate part of an energy storage module according to the present invention in more detail.
Figure 2B:
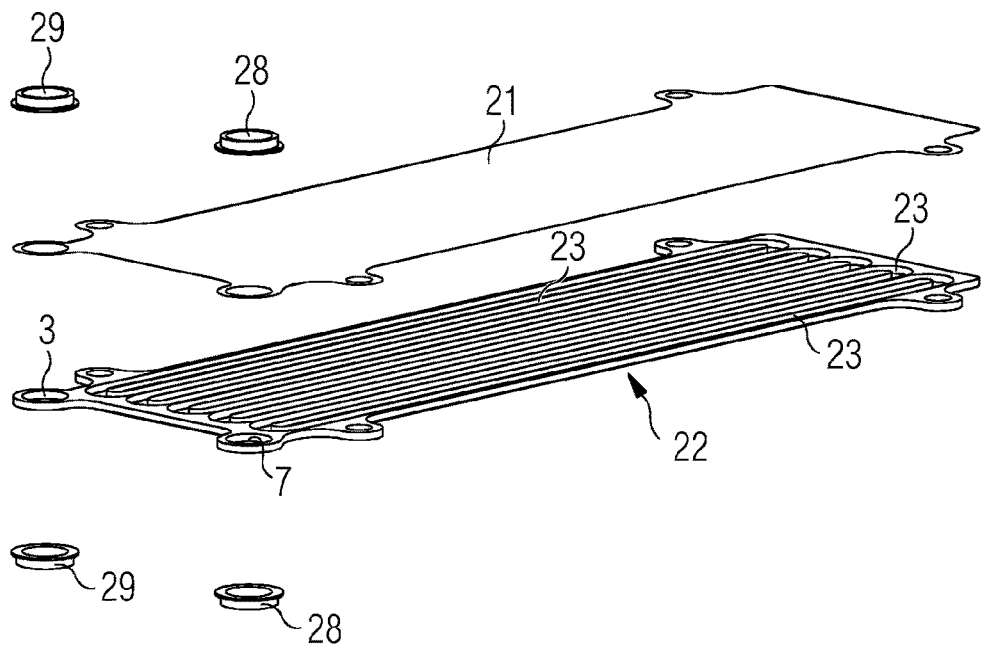

FIGS. 2a and 2b show more detail of the modules 4. Each module comprises a cooler, or cell carrier, or casing 20, as shown in FIG. 2a, into which an energy storage device (not shown), such as a battery cell, is fitted. The carrier is typically made from a polymer plastics material for light weight and low cost. As shown in FIG. 2b, the cooler may be formed by laminating, or welding, a plate 21 to a series of raised sections 23 formed, typically by moulding, in another piece of the same polymer plastics material. This forms closed channels, or conduits, through which cooling fluid may flow from one end to another. Alternatively, cooling channels 22 of the cooler 20 may be formed as an integral part of the carrier, for example by additive manufacturing techniques. A battery cell may be installed in each cooler 20, for example on outer surface 27 of the cooler. The outer surface of the cooler 22 may be in direct contact with one surface of the battery cell to provide effective cooling over a large surface area, without any direct contact of the cooling fluid to the energy storage device, or cell.

Cooling fluid flows from the inlet pipe 3 through the channels, or conduits 23 of the cooler 22, cooling the cell by thermal transfer from the surface of the cell through the thin tubing 23 to the cooling fluid. The cooling fluid channels or tubing have a typical overall thickness in the range of 5 mm to 20 mm, with a wall thickness in the range of 1 mm to 5 mm and advantageous, no more than 3 mm for a polymer plastics material. The cooling fluid is carried away into the outlet pipe 7 and returned to the cooling unit 1 to be cooled again. The tubing 23, formed under plate 21, covers a substantial part of the cell surface on the side that it contacts, anything from 30% to 75% of the cell surface area on that side of the cell.

Figure 3A:
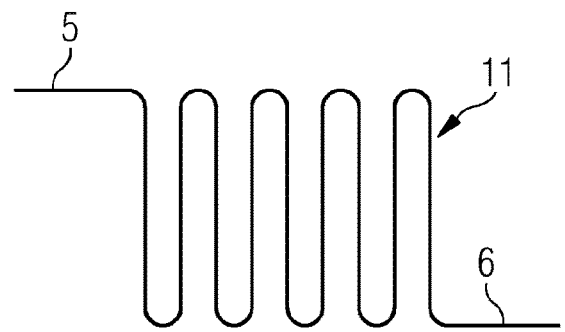
FIGS. 3a and 3b show more detail of coolers which may be used in the examples of FIGS. 1 and 2.
Figure 3B:
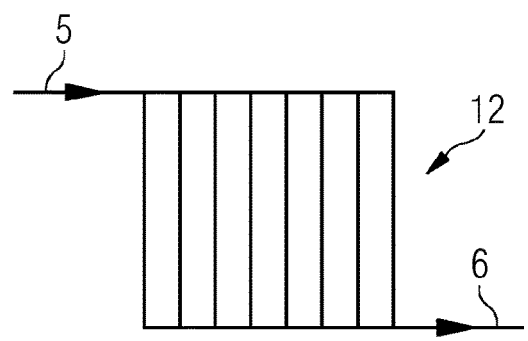

The overall design has a significantly reduced total material weight and cost by using the cooling liquid pipes to flow cooling fluid directly adjacent to the cell surface, instead of conventional cooler block, heat exchanger designs. In addition, this cooling is provided for normal operation, to keep the cell within a temperature range that is beneficial to performance and operational lifetime, rather than as a one off, only in the case of a thermal event. The thin cooling fluid channels 23 may be formed in any suitable form, connected between the inlet and outlet pipes 3, 7 via the tubes 5, 6. Preferably, the cross section of the channels is square to maximise the contact and minimise the amount of plastics material between the cooling fluid and the energy storage device. However, other cross sections could be used, such as circular cross section tubing. The tubing 23 may be in the form of a continuous serpentine 11 connected between the inlet and outlet tubes 5, 6, as shown in FIG. 3a and the example of FIG. 2b, or there may be multiple parallel rows 12 of tubing fed by a common supply from the inlet pipe 3 connected to the inlet tube 5 and exiting through outlet tube 6, as shown in FIG. 3b, to outlet pipe 7.

The tubing 23 may be metal, but more typically is a synthetic material, such as polymer plastics, for example polythene, polyamide, such as PA66 plastics, or thermoplastics such as TCE2, TCE5, or other suitable materials, which may be moulded or extruded, or formed by additive manufacturing techniques to produce the required shape. The tubing material is able to withstand normal operating temperatures of the energy storage modules. An alternative is to form channels walls on a base, for example by moulding, then apply a plate to the upper surface of the walls, which is welded, or laminated, or otherwise fixed in place. The conduits for cooling fluid may have an overall thickness in the range of 5 mm to 20 mm, with a wall thickness in the range of 1 mm to 5 mm, advantageous, no more than 3 mm for a polymer plastics material.

The cell is cooled directly by flowing cooling fluid in the cooling channels over a substantial part of the cell surface, with very little thermal resistance in the material of the cooling channels, so heat is effectively carried away. Conventional cooling arrangements have suffered from hot spots for areas of the cell which were far away from the cooler block, or heat exchanger, but this cooler for each energy storage device avoids this problem. This has the effect of slowing down the aging process of the cell, so increasing its lifetime.

Figure 4:
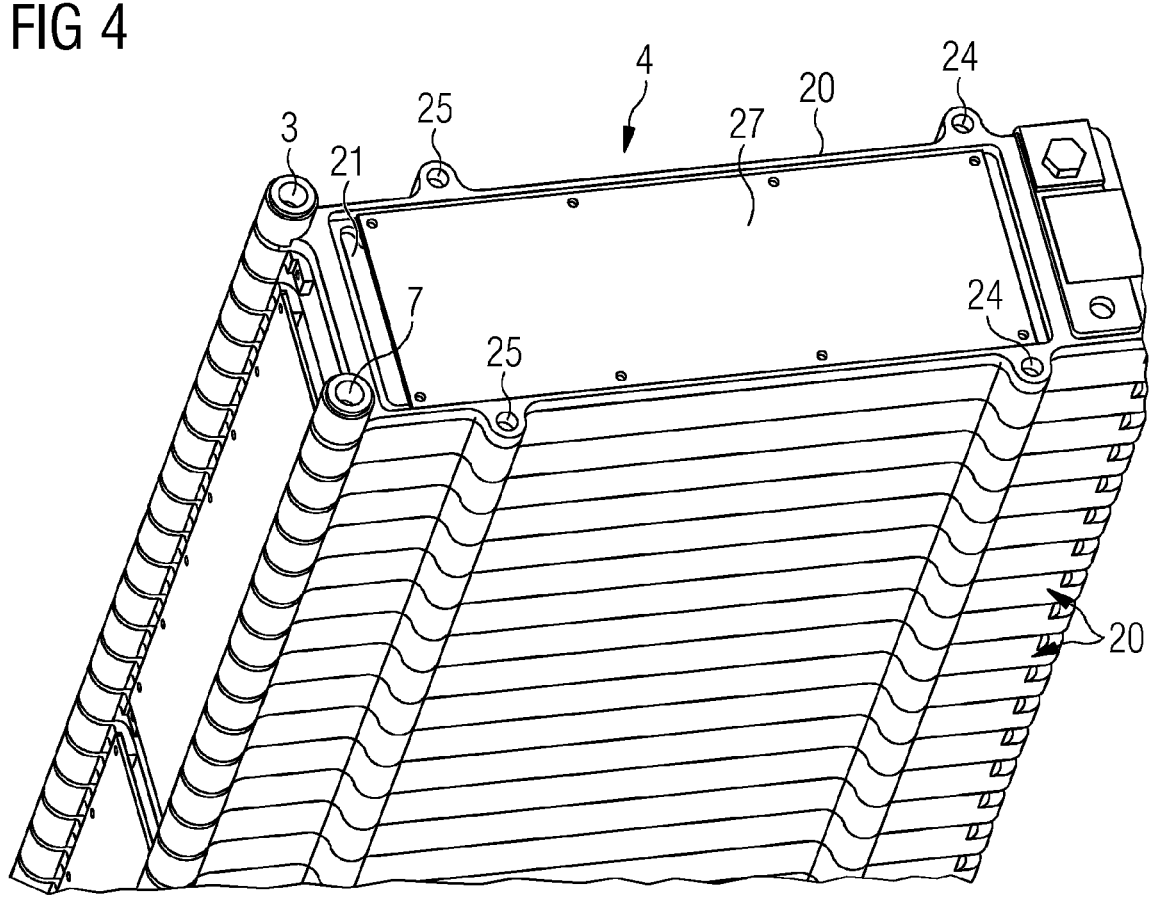
FIG. 4 illustrates how multiple energy storage modules according to the present invention may be stacked together; and, FIG. 5 illustrates more detail of part of the energy storage module of the present invention.
Figure 5:
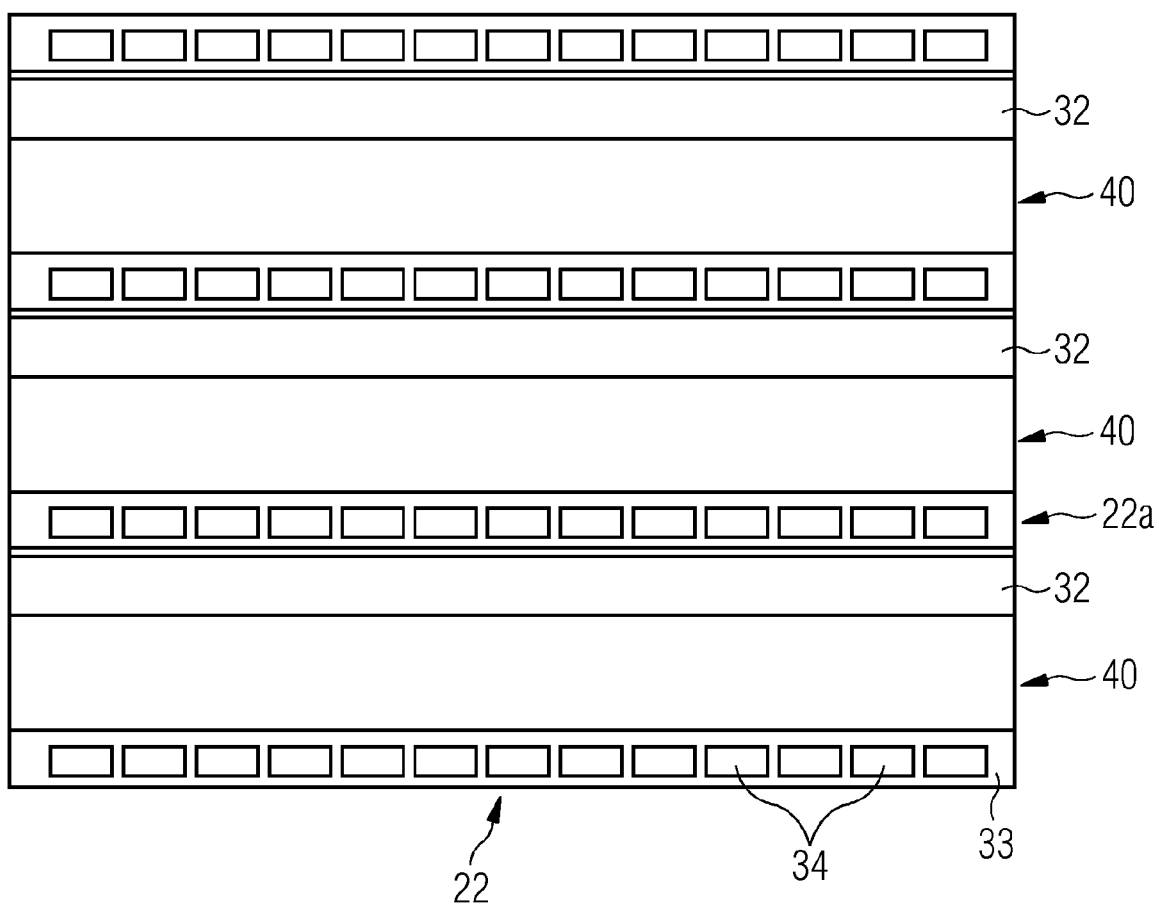

Energy storage modules 4, are formed from a plurality of cells stacked together on their coolers 20, as shown in FIG. 4. Cooling fluid enters the tubes of each cooler from an opening 70 in the common inlet pipe 3 that runs along the stack and exits through an opening 71 in the common outlet pipe 7 that runs along the stack. In a closed system, the cooling fluid is pressurised and circulates around the stack of modules via the common pipes 3, 7 and individual coolers 22 of each module 4. In order to maintain compression of the cell by the cooler 20 to take account of expansion of the cell over time, there needs to be some flexibility to allow for the changes over time. This may be provided by a separate flexible layer 32, as shown in FIG. 5, provided between one surface of the energy storage device 40 and an adjacent cooler 22a. If an insulating layer is used, the insulating layer may perform this function, or with heat transfer controlled by the coolers on either side of the energy storage device, a flexible sheet may be used to ensure that the cooler can still apply pressure. A low pressure is applied, typically below 0.2 bar, on the cell wall to increase performance and lifespan and accept swelling due to normal operation and degradation during the complete life of the cell. A section 33 of the cooler 22 is in direct contact with one surface of the energy storage device 40, the thin walls allowing cooling fluid 34 to cool the energy storage device as the fluid flows through the channels 23. The coolers 20 are mounted on one another and fixed together via fittings, such as bolts in fittings 24, 25. Between each water inlet section 3 and outlet section 7 on each cooler 20, a spacer, or washer 29, 28 may be provided.

The invention has the advantage that the cooler 22 of each energy storage device in the module transfers developed heat directly to the cooling liquid through the whole cell surface, on at least one side of the cell. Stacking the integral cells and coolers as shown in FIG. 4 allows the opposite surface of the cell to be cooled by the cooler of the neighbouring cell in the stack, if a thermally insulating layer is not used on that side. The direct contact of cooler and cell in each module makes the cooling more effective than air cooling, or conductive fins with water cooling, so reducing the temperature difference between cell and coolant in normal operation. However, the material from which the cooling channels are made may be chosen to have a melting temperature above the safe operating temperature of 60° C., typically above 100° C., such that, in the case of a thermal runaway, the tubing melts and provides free flowing cooling liquid directly onto the surface of the energy storage device. When using this feature of the invention, the material is generally chosen to melt at a temperature of no more than 300° C., although in some cases, this may be up to 400° C.

A further feature of the present invention is that, in addition to the thin, lightweight material of the cooling channels between each cell carrying the cooling liquid, allowing effective heat transfer, the cooling system may further comprise sections created in the material of the cooling channels that melt at temperatures close to typical thermal runaway temperatures (i.e. above 170 degrees C.). The melting point of these rupture sections is typically chosen to be above the safe operating temperature of the energy storage device, i.e. above 60° C., for example, between 130° C. and 180° C. When this embodiment is provided, the cooling fluid channels (other than where the rupture points are provided) may be chosen to have a melting point above 250° C. and may even be made to be heat resistant up to about 400° C. for at least 10 s. If a part of the cell is at an elevated temperature, sufficient to cause one or more of these sections to melt, then the cooling system channel has an open point, allowing cooling liquid to come into direct contact with the cell in which thermal runaway is occurring. This additional, active cooling of the cell consumes energy in the burning cell by evaporation of the cooling liquid.

In the event of a section of a cooler melting, whether the cooling channels themselves, or specific rupture points within them, due to thermal runaway, or other overheating, forming an opening, there is a large pressure drop, unlike the case in normal operation. As all the coolers of the energy storage modules in the stack are connected in parallel, then cooling liquid from all coolers in the energy storage system flows to the open circuit in the cell suffering a thermal event and exposes that cell to a large amount of cooling liquid, giving a fast reduction in temperature by direct contact of cooling fluid with the overheating cell, to prevent the heat and thermal runaway spreading to neighbouring cells. Actively exposing the critical area to flowing water increases the safety of the energy storage system by very effectively driving the temperature of the cell down. The cooling system is a normally closed system, so the total volume of fluid that goes to cool an overheating cell is limited to the amount that the closed system contains.

A further benefit of this additional feature is that gas and fumes from the cell in which a thermal event is taking place are mixed with water vapour, substantially reducing the flammability of the gas and the gas mixed with water vapour is released to an exhaust system through the battery casing. Mixing the flammable gas with water vapour makes the gas handling in a thermal event less challenging as the flammable gas is mixed with vapour. In addition, there is no need for exhaust cooling and the risk of self-ignition of the hot gas inside the module is substantially reduced, if not removed.

The stacking arrangement using one cooler to cool two adjacent cells helps to reduce weight and material cost. Another benefit of the direct contact over the surface of the cell, is that this allows the operating temperature of the cooling liquid to be increased, thereby reducing the likelihood of condensation occurring inside the system. The use of polymer plastics materials for the cooler, rather than metal allows weight and cost to be reduced to a fraction of the conventional solutions. In addition, the modules no longer require a cooler block or heat exchanger, as is required with conventional air or water cooled systems, so the volumetric footprint can be reduced. This is particularly useful for marine and offshore applications, where space is at a premium.

The present invention is described with respect to the example of Li-ion batteries, but is equally applicable to any other type of electrochemical cell based energy storage device, such as alkaline, or nickel-metal hydride (NiMH), or others, as well as to other energy storage technologies, such as capacitors, supercapacitors or ultracapacitors, which may also suffer if the temperature of modules of the stored energy units regularly goes outside an advantageous operating range, reducing the overall lifetime and increasing maintenance costs. For a vessel, or system, relying on stored energy as its primary, or only power source, reliability is particularly important and optimising operating conditions is desirable.

The invention claimed is:

1. An energy storage module, the module comprising:
a plurality of energy storage devices; and
a plurality of coolers, each cooler having one of the plurality of energy storage devices mounted thereon;
each cooler of the plurality of coolers comprises:
   a base panel that defines a pocket, a first inlet and a first outlet;
   a cooler insert that partially encloses a plurality of cooling fluid channels for circulating cooling fluid, the cooler insert disposed within the pocket and including a second inlet and a second outlet; and
   a plate in contact with the cooler insert and including a third inlet and a third outlet, the plate, the cooler insert, and the base panel cooperating to enclose the plurality of cooling fluid channels, the first inlet, the second inlet, and the third inlet cooperating to define a cooler inlet, and the first outlet, the second outlet, and the third outlet cooperating to define a cooler outlet;
an inlet manifold at least partially formed by the cooperation of the cooler inlets of each of the plurality of coolers; and
an outlet manifold at least partially formed by the cooperation of the cooler outlets of each of the plurality of coolers, wherein each of the cooling fluid channels is in direct contact with a surface of the energy storage device mounted thereto, each cooling fluid channel coupled to the inlet manifold to receive cooling fluid from a source of cooling fluid and coupled to the outlet manifold to return the cooling fluid to the source, and wherein the cooler insert, the base panel, and the plate are formed from a material having a melting point between 100° C. and 400° C.

2. The module according to claim 1, wherein the cooler is formed by additive manufacturing, welding, or lamination.

3. The module according to claim 1, wherein the cooling fluid channels have a circular or square cross section.

4. The module according to claim 1, wherein the cooling fluid channels have a wall thickness of no more 5 mm.

5. The module according to claim 1, wherein at least 30% of one surface of each energy storage device is in direct contact with the cooling fluid channels of the cooler to which it is mounted.

6. The module according to claim 1, wherein at least 75% of one surface of each energy storage device is in direct contact with the cooling fluid channels of the cooler to which it is mounted.

7. An energy storage module, the module comprising:
one or more energy storage devices; and
for each energy storage device, a cooler on which the energy storage device is mounted, the cooler being in contact with the energy storage device;
wherein the cooler comprises one or more cooling fluid channels for circulating cooling fluid, the channels being in contact with a surface of the energy storage device, each cooling fluid channel being adapted to receive cooling fluid from a source of cooling fluid, extract heat from the energy storage device and return the cooling fluid to the source;
wherein the cooling fluid channels comprise a polymer material, polythene, polyamide, or thermal plastic; and
wherein at least a part of the cooling fluid channel comprises a material having a melting point within a melting point range, and wherein the cooling fluid channels further comprise one or more rupture sections having a melting point that is below the melting point range of the cooling fluid channels.

8. The module according to claim 7, wherein the melting point of the one or more rupture sections is between 130° C. and 180° C.

9. The module according to claim 1, wherein the energy storage device comprises one of an electrochemical cell, a battery cell, a fuel cell, a capacitor, ultracapacitor, or supercapacitor.

10. The module according to claim 1, wherein the energy storage device comprises a Li-ion, NiMH, or alkaline battery.

11. The module according to claim 1, wherein the cooling fluid comprises water or water glycol.

12. The module according to claim 1, wherein at least a part of the base panel, cooler insert, and the plate comprises a material having a melting point between 100° C. and 300° C.

13. The module according to claim 1, further comprising a plurality of flexible layers, each flexible layer disposed between and in direct contact with one of the plurality of energy storage devices and one of the plurality of coolers.

* * * * *